United States Patent Office 3,646,156
Patented Feb. 29, 1972

3,646,156
POLYAMIDE CONTAINERS OF 2,2,4 AND/OR 2,4,4 TRI-METHYL HEXAMETHYLENE DIAMINE
Johannes Schneider and Wolfgang Pungs, Troisdorf, Germany, assignors to Dynamit Nobel Aktiengesellschaft
No Drawing. Filed Oct. 27, 1969, Ser. No. 869,856
Claims priority, application Germany, Oct. 30, 1968,
P 18 05 921.7
Int. Cl. C08g 41/04
U.S. Cl. 260—857 TW                              4 Claims

ABSTRACT OF THE DISCLOSURE

A thermoplastic polyamide molding composition capable of forming transparent hollow blow molded objects at forming temperatures in the range of 170 to 230° C., comprises:
(a) at least 40 weight percent of an amorphous polyamide composed of an aromatic dicarboxylic acid, a trimethyl hexamethylene diamine and a normal aliphatic diamine, the normal aliphatic diamine comprising up to 30 weight percent of the diamines used, and
(b) the balance, aside from customary additives, of a second polyamide formed from a ω-amino acid or ω-lactam, or formed from an aliphatic dicarboxylic acid and a normal aliphatic diamine.

PRIOR ART

The hitherto known amorphous, thermoplastic polyamide molding compositions have been poorly suited for the manufacture of hollow objects by blow molding and often resulted in yellowed moldings susceptible to breakage. For many applications, particularly in the packaging sector, it is desired that containers manufactured from polyamides be clear and transparent, have a smooth and even surface, be capable of being heat-sealed, and exhibit a low gas permeability. In addition, they should be rigid, dimensionally stable and warp-free at elevated humidities, within a wide temperature range.

The amorphous polyamides (see U.S. 3,150,117) made of terephthalic acid and 2,2,4-trimethyl hexamethylene diamine and/or 2,4,4-trimethyl hexamethylene diamine are unsuitable for the aforementioned applications. They discolor upon extrusion and adhere to the die during blowing, and the containers manufactured therefrom display shrink holes. Such molding compositions tend also to swell upon being processed in blow machines.

Even the substituting of hexamethylene diamine for a part of the trimethyl hexamethylene diamines (see U.S. 3,294,758) does not result in any substantial improvement of the properties of the polyamide molding batches.

In lieu of terephthalic acid or isophthalic acid one may use their diaryl or dialkyl esters with the above diamines to make the molding composition. Such a polymer can be blown into dimensionally stable and transparent moldings if the viscosity number of the molding batches (according to German Industrial Standards, DIN 35,727, in a 0.5 percent-by-weight solution in m-cresol at 25° C.) shows values between 130 and 160. The drawback that manifests itself upon the blowing of these molding batches in this viscosity range is that their flowability is not particularly good at processing temperatures between 190 and 220° C.

Even a compounding of amorphous polyamides, whose acid component is a dibasic aromatic dicarboxylic acid and whose amine components are either 2,2,4- and/or 2,4,4-trimethyl hexamethylene diamine or an unbranched aliphatic amine with 6 to 12 carbon atoms, with polyamides of the nylon types does not yield any molding compositions suitable for blowing into hollow bodies with good mechanical properties at temperatures between 170 and 220° C. Even if the amorphous polyamide used have viscosity values between 80 and 120, the molding compositions prepared from them exhibit a poor conversion efficiency and can be processed to blown bodies at high revolution speeds only. Moreover, hollow bodies manufactured therefrom are transparent only under certain conditions.

THIS INVENTION

The above drawbacks can be obviated if, in the manufacture of blown objects, the thermoplastic polyamide molding composition used comprises:
(a) 40 to 99 parts by weight, preferably 60 to 99 parts by weight, of an amorphous polyamide of an aromatic dicarboxylic acid and 2,2,4- and/or 2,4,4 - trimethyl hexamethylene diamine and a straight chain or normal aliphatic diamine having 6 to 12 carbon atoms, with the diamine mixture consisting in the range of 70 to 99 weight percent of the trimethyl hexamethylene diamines and in the amount of 1 to 30 weight percent of the straight chain aliphatic diamine;
(b) 1 to 60 parts by weight, preferably 1 to 40 parts by weight of a polyamide of the nylon type based on ω-amino acids or ω-lactams, or based on aliphatic dicarboxylic acids and straight chained aliphatic diamines.

Granulated molding materials prepared from such polymers are particularly well suited for forming transparent hollow objects if the amorphous component has a viscosity in the range of 80 to 160 (according to DIN 53,727 in a 0.5 percent by weight solution in m-cresol at 25° C.).

The finished molding composition preferably has a viscosity between 130 and 200 and is capable of being blown at temperatures between 170 and 230° C.

The amorphous polyamides used are composed of mono- and poly-nuclear acids such as terephthalic and isophthalic acid or 4,4'-diphenyl ether dicarboxylic acid. The use of mixtures of these acids is advantageous.

The normal aliphatic diamine component of the amorphous polyamide preferably contains between 3 to 12 carbon atoms, preferably 6 to 12 carbon atoms. Particularly suitable are hexamethylene diamine and nonamethylene diamine. Mixtures of the straight-chain aliphatic diamines can also be used.

The manufacture of the amorphous polyamides can be carried out using known processes customarily used for the manufacture of polyamides containing dicarboxylic acid and diamine radicals.

Thus, it is for instance possible to polycondense in aqueous, concentrated solution, the mixed salt of an aromatic dicarboxylic acid and the diamine mixture first under pressure and then under reduced pressure at temperatures up to approximately 280° C., or to perform the same process without any prior isolation of the salt following dissolution of substantially equimolar amounts of the aromatic dicarboxylic acid and the diamine mixture in hot water. Moreover, it is possible to by-pass the pressure stage by means of pre-condensation of the salt in high-boiling solvents, for instance cresols, and to apply a vacuum in the final stage of the polycondensation.

The lower alkyl esters of the aromatic dicarboxylic acid can be reacted with substantially equimolar amounts of the diamine mixture in the presence of water accompanied by the separation of alcohol, and polycondense the reaction product like an aqueous salt solution. Instead of lower alkyl esters one may start out also from diaryl esters of the aromatic dicarboxylic acids and renounce in this case the concomitant use of water. Finally, it is also possible to react dihalides of aromatic dicarboxylic acids with equimolar amounts of the diamine mixture in the presence of basic compounds using the process of the solution condensation or that of the contact condensation.

The second component of the polyamide compound consists of partially crystallized or partially crystallizable polyamides known under the generic term "nylon." Such polyamides are, for instance, nylon 6, nylon 6,6, nylon 6,10, nylon 11, and nylon 12. Also, suitable as the second polyamide component are the cocondensates obtained from hexamethylene diamine/adipic acid/ε-caprolactam or from hexamethylene diamine/adipic acid/ε-caprolactam and p,p'-diamino-dicyclo-hexamethylene.

The molding compositions according to this invention are prepared particularly advantageously as a melt. As a result of such a flux type compounding, uniform and homogeneous masses can be achieved within a short time.

In this connection it is recommended to masterbatch the pertinent components at room temperature in a rapidly rotating mixer and to plasticize the resultant mixture in a standard compounding unit, for instance, in a twin-screw extruder. The temperatures required for this purpose are between 220 and 280° C.

Compounding in a rapidly revolving vortex-type mixer is possible. In this case, one starts out preferably with as fine as possible a powder or granulated material of the two polyamides to be compounded.

It is also possible to add to the molding batches according to the invention the additives customarily used with polyamide molding materials such as dyestuffs, sun-checking agents or flam-inhibiting agents.

EXAMPLES.—EXAMPLES 1a–c

An amorphous polyamide having a viscosity value of 110, prepared in known manner from terephthalic acid dimethyl ester and a mixture consisting of 80 percent by weight of 2,2,4-trimethyl hexamethylene diamine and 20 percent by weight of hexamethylene diamine was processed to form a molding composition in accordance with the conditions listed in Table 1. The admixture of the nylon amounts mentioned in the table relates to the finished compound.

Under the conditions set forth in Table 2, the resultant compounds were blown to form bottles of a capacity of about 420 cc. The bottles were subjected to a drop test to determine at which height of fall water-filled bottles would break. The elevation in question was determined at which one haf of the bottles tested:

(a) break directly after being filled with water, and
(b) break after storage in water for 24 hours.

The test results can be found in Table 3.

EXAMPLES 2a–b

The diamine mixture used for the manufacture of the amorphous polyamide consisted in these tests of 70 percent by weight of 2,2,4-trimethyl hexamethylene diamine and 30 percent by weight of hexamethylene diamine. The amorphous polyamide was prepared therefrom in known manner by condensation with terephthalic acid dimethyl ester. It was compounded with nylon 6,6 according to the conditions shown in Table 1. The further processing of the finished compound took place similar to that of Example 1.

The 2,4,4-trimethyl hexamethylene diamine used in the aforementioned examples for the manufacture of the amorphous polyamide can partly or in whole be replaced by 2,3,3-trimethyl hexamethylene diamine. In this event, the processing temperatures remain the same and hollow objects manufactured therefrom posses properties identical to those manufactured by using 2,2,4-trimethyl hexamethylene diamine by itself.

TABLE 1

[Processing conditions for the preparation of the melt compound]

| Examples | Viscosity | Type of machine | Cylinder temperatures (° C.) | | | | | | | | R.p.m. |
|---|---|---|---|---|---|---|---|---|---|---|---|
| | | | 1 | 2 | 3 | 4 | 5 | 6 | 7 | 8 | |
| 1. Terephthalic acid dimethyl ester and 80 percent by weight 2,2,4- and/or 2,4,4-trimethyl hexamethylene diamine and 20 percent by weight hexamethylene diamine plus— | 110 | Extruder R 60, "Reifenhäuser"; Screw 20 D; Comp. 1:2.6. | | | | | | | | | |
| (a) 20%/wt. Nylon 6 | 157 | do | 190 | 220 | 240 | 260 | 260 | 240 | 230 | 230 | 14 |
| (b) 40%/wt. Nylon 6, 10 | 178 | do | 195 | 200 | 220 | 245 | 254 | 230 | 225 | 225 | 12 |
| (c) 5%/wt. Nylon 11 | 160 | do | 190 | 220 | 240 | 255 | 245 | 245 | 230 | 225 | 14 |
| 2. Terephthalic acid dimethyl ester and 70 percent by weight 2,2,4- and/or 2,4,4-trimethyl hexamethylene diamine and 30 percent by weight hexamethylene diamine plus— | | do | | | | | | | | | |
| (a) 10%/wt. Nylon 6.6 | | do | 225 | 240 | 270 | 270 | 265 | 240 | 235 | 220 | 12 |
| (b) 5%/wt. Nylon 12 | | do | 210 | 230 | 245 | 255 | 255 | 255 | 240 | 230 | 16 |

TABLE 2

[Processing conditions for the manufacture of bottles having a capacity of 420 cc. on the blowing apparatus (Bekum, Type E 50)]

| Composition | R.p.m. | Cylinder temperatures (° C.) | | | | Die temp. | Blowing time (secs.) | Duration (secs.) | Ejection (secs.) | Current consumption |
|---|---|---|---|---|---|---|---|---|---|---|
| | | 1 | 2 | 3 | 4 | | | | | |
| 1. Terephthalic acid dimethyl ester and 80 percent by weight 2,2,4- and/or 2,4,4-trimethyl hexamethylene diamine and 20 percent by weight hexamethylene diamine plus— | | | | | | | | | | |
| (a) 20%/wt. Nylon 6 | 24 | 180 | 200 | 210 | 185 | 180 | 7 | 6 | 6 | 6.6 |
| (b) 40%/wt. Nylon 6, 10 | 24 | 175 | 190 | 190 | 200 | 200 | 7 | 6 | 6 | 7 |
| (c) 5%/wt. Nylon 11 | 18 | 180 | 200 | 210 | 200 | 200 | 7 | 6 | 6 | 6.5 |
| 2. Terephthalic acid dimethyl ester and 70 prcent by weight 2,2,4- and/or 2,4,4-trimethyl hexamethylene diamine and 30 percent by weight hexamethylene diamine plus— | | | | | | | | | | |
| (a) 10%/wt. Nylon 6.6 | 24 | 170 | 200 | 210 | 200 | 190 | 7 | 6 | 6 | 6.8 |
| (b) 5%/wt. Nylon 6 | 18 | 180 | 200 | 200 | 190 | 190 | 7 | 6 | 6 | 6.5 |

TABLE 3

Drop Test: Drop height in m. at 50% breakage
Bottle Capacity: 420 cc.—number of bottles tested=50
Filled with: Water, 20° C.

| Blown bodies made of terephthalic acid dimethyl ester and | Bottle weight (g.) | Drop height (direct) (m.) | Drop height in meters [1] |
|---|---|---|---|
| 1. 80 percent by weight of 2,2,4- and/or 2,4,4-trimethyl hexamethylene diamine and 20 percent by weight hexamethylene diamine plus— | | | |
| (a) 20%/wt. Nylon 6 | 19 | 1.6 | 1.8 |
| (b) 40%/wt. Nylon 6,10 | 19.5 | 1.4 | 1.4 |
| (c) 5%/wt. Nylon 11 | 19 | 1.8 | 1.8 |
| 2. 70 percent by weight of 2,2,4- and/or 2,4,4-trimethyl hexamethylene diamine and 30 percent by weight hexamethylene diamine plus— | | | |
| (a) 10%/wt. Nylon 6.6 | 19.5 | 1.6 | 2.1 |
| (b) 5%/wt. Nylon 6 | 19.5 | 1.6 | 1.8 |

[1] At 50% breakage after 24 hrs. storage in water.

What is claimed is:

1. A thermoplastic, transparent polyamide molding composition comprising:
    (a) 40 to 99 parts by weight of an amorphous polyamide composed of an aromatic dicarboxylic acid and 2,2,4- and/or 2,4,4-trimethyl hexamethylene diamine, wherein about 1 to 30 percent by weight of the trimethyl hexamethylene diamines have been replaced by a normal straight chained unsubstituted aliphatic diamine; and
    (b) 1 to 60 parts by weight of a crystallizable polyamide formed from a ω-amino acid or a ω-lactam, or formed from an aliphatic dicarboxylic acid and a normal straight chained unsubstituted aliphatic diamine.

2. The composition of claim 1 wherein said polyamide (a) comprises in the range of 60 to 99 parts by weight of said mixture and said second polyamide (b) comprises in the range of 1 to 40 parts by weight thereof.

3. The composition of claim 2 wherein said amorphous polyamide is a polycondensate of
    (a) terephthalic acid, and
    (b) a mixture of 80 percent by weight of 2,2,4- and/or 2,4,4-trimethyl hexamethylene diamine and 20 percent by weight of hexamethylene diamine.

4. A transparent hollow object formed at a temperature in the range of 170 to 230° C. by blow molding a composition consisting of a polyamide mixture as the only polymeric component thereof having a composition of:
    (a) 40 to 99 parts by weight of an amorphous polyamide composed of an aromatic dicarboxylic acid and 2,2,4- and/or 2,4,4-trimethyl hexamethylene diamine, wherein about 1 to 30 percent by weight of the trimethyl hexamethylene diamines have been replaced by a normal straight chained unsubstituted aliphatic diamine; and
    (b) 1 to 60 parts by weight of a scond crystallizable formed from a ω-amino acid or a ω-lactam, or formed from an aliphatic dicarboxylic acid and a normal straight chained unsubstituted aliphatic diamine.

References Cited
UNITED STATES PATENTS

| | | | |
|---|---|---|---|
| 3,195,603 | 7/1965 | Ahles | 260—857 |
| 3,216,965 | 11/1965 | Cipriani | 260—857 |
| 3,457,325 | 7/1969 | Anton | 260—857 |

FOREIGN PATENTS

| | | | |
|---|---|---|---|
| 919,096 | 2/1963 | Great Britain | 260—78 |

PAUL LIEBERMAN, Primary Examiner

U.S. Cl. X.R.

260—78 R